United States Patent [19]
Johnson, Jr.

[11] Patent Number: 5,507,261
[45] Date of Patent: Apr. 16, 1996

[54] FOUR CYCLE ENGINE WITH TWO CYCLE COMPRESSION BRAKING SYSTEM

[75] Inventor: John L. Johnson, Jr., Brimfield, Ill.

[73] Assignee: Caterpillar Inc., Peoria, Ill.

[21] Appl. No.: 440,164

[22] Filed: May 12, 1995

[51] Int. Cl.⁶ .................................................. F02D 13/04
[52] U.S. Cl. ........................................ 123/322; 123/508
[58] Field of Search ................................ 123/321, 322, 123/507, 508, 509

[56] References Cited

U.S. PATENT DOCUMENTS

| | | |
|---|---|---|
| 1,044,289 | 11/1912 | Taylor . |
| 3,572,300 | 3/1971 | Stager ..................................... 123/321 |
| 4,413,712 | 1/1984 | Mayne et al. ........................... 123/321 |
| 4,602,604 | 7/1986 | Kauer ...................................... 123/508 |
| 4,664,070 | 5/1987 | Meistrick et al. ....................... 123/21 |
| 4,706,624 | 11/1987 | Meistrick et al. ..................... 123/321 |
| 4,721,075 | 1/1988 | Kasai ....................................... 123/508 |
| 4,739,733 | 4/1988 | Hartmann ............................... 123/508 |
| 4,836,171 | 6/1989 | Melde-Toczai ........................ 123/508 |
| 4,898,128 | 2/1990 | Meneely ................................ 123/90.12 |
| 4,996,957 | 3/1991 | Meistrick ............................... 123/321 |
| 5,000,145 | 3/1991 | Quenneville ........................... 123/321 |
| 5,183,018 | 2/1993 | Vittorio et al. ........................ 123/321 |
| 5,201,290 | 4/1993 | Hu .......................................... 123/321 |
| 5,255,650 | 10/1993 | Faletti ..................................... 123/322 |
| 5,315,974 | 5/1994 | Sabelström ............................. 123/321 |

FOREIGN PATENT DOCUMENTS

| | | | |
|---|---|---|---|
| 3909822 | 9/1990 | Germany ................................ 123/507 |
| 4026499 | 8/1991 | Germany ................................ 123/321 |

*Primary Examiner*—Carl S. Miller
*Attorney, Agent, or Firm*—Frank L. Hart

[57] ABSTRACT

An on/off compression braking system is provided which when actuated controllably opens one inlet valve and one outlet valve in response to the actuation of the injector unit rocker arm and deactivates the exhaust valve rocker arm. This braking system thereby is useful on four cycle engines and is of a construction which eliminates elements of heretofore utilized compression braking systems and provides a four cycle engine with a two cycle compression braking system.

6 Claims, 3 Drawing Sheets

FOUR CYCLE ENGINE WITH TWO CYCLE COMPRESSION BRAKING SYSTEM

TECHNICAL FIELD

The present invention relates to a two cycle compression braking system for a diesel four cycle engine.

BACKGROUND ART

Compression braking systems for diesel engines have been known for some time. One of such braking system is known in the art as a Jake Brake. Such heretofore utilized systems typically have cast iron housings bolted above the engine valve mechanisms and utilize another valve train rocker arm at a different position for actuation motion and timing. Such systems are undesirably heavy, utilize space in the engine compartment which is at a premium, and include additional elements.

The present invention overcomes the problems set forth above by integrating the braking system into various components already present in the engine system. This invention converts a four cycle engine to a two cycle compression braking system. Further, the system of this invention is more simple, easier to construct and maintain, uses less parts, and functions to controllably open more valves per cylinder. This represents a savings of labor, time, materials, natural resources and increases efficiency and effectiveness.

DISCLOSURE OF THE INVENTION

In one aspect of the invention, a compression braking system is provided for a four cycle engine. The engine has a low pressure oil supply, an oil reservoir, and a plurality of cylinders. Each cylinder has first and second normally closed engine inlet valves, first and second normally closed engine exhaust valves, an inlet bridge extending between the inlet valves and adjacent an associated inlet rocker arm and an exhaust bridge extending between the engine exhaust valves and adjacent an associated exhaust rocker arm. A cam system is associated with each inlet and exhaust rocker for controllably moving the rocker arm and the associated valves to an open position. An electronically controlled cam actuated fuel injector unit has a plunger an associated fuel injection rocker arm system. The cam of the injection rocker arm has two actuation lobes positioned about 180 degrees one from the other. The compression braking system has a bridge connector fixedly connected to the inlet bridge and the exhaust bridge. The inlet and exhaust bridges each are of a construction sufficient for rocking motion of the inlet and exhaust bridges relative to their associated inlet and exhaust valves. An on/off brake controlling system is connected to the low pressure oil supply. A piston is positioned in the rocker arm, is connected to the injector unit, and adapted for controllably pressurizing said piston, contacting said bridge connector and moving said bridge connector and one engine inlet valve and one engine exhaust valve to an open position in response to movement of the injector unit piston by the injector unit rocker arm. A check valve is positioned between the brake controlling system and the injector rocker arm piston. The exhaust rocker arm has first and second rocker arm portions pivotally moveable relative to one another and a pair of over-center holding links pivotally connected one to the other and pivotally connected at opposed ends to a respective exhaust rocker arm portion. A compression spring is connected to the first rocker arm portion and positioned adjacent the first link, in forcible contact therewith, and maintaining the links in an actuatable first position. A second piston has one end connected to one of the exhaust rocker arm portions and the other second piston end positioned adjacent the pivotal connection of the links one to the other. The second piston is hydraulically connected in fluid communication to said first piston and actuatable therewith. The exhaust rocker arm is normally maintained in the first actuatable position via said spring and pair of links and is moveable to and maintained in a second deactivated position via said extended second piston, pair of links and pressurized controlling system.

BEST MODE FOR CARRYING OUT THE INVENTION

Figure 1:
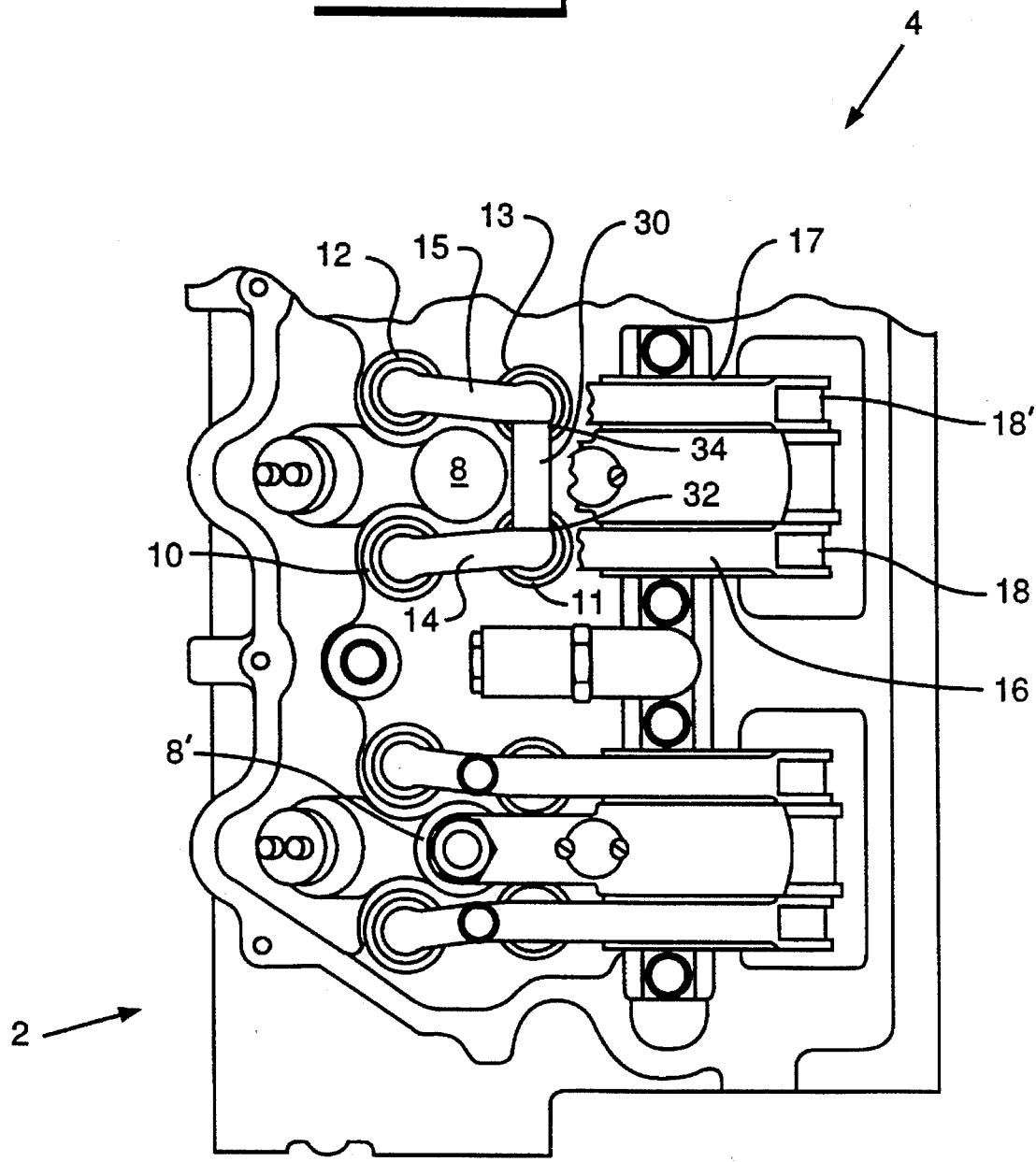
FIG. 1 is a diagrammatic top view of a portion of an engine.

Referring to the drawings, the compression braking system 2 of this invention is designed and constructed for a four cycle engine 4 that is well known in the art. Such engines 4 have an oil reservoir 6 and a plurality of cylinders 8,8'. For purposes of brevity, the subject invention will be described relative to a single cylinder 8 since each cylinder will have like compression brake elements and be associated with certain other common elements.

The cylinder 8 has first and second normally closed engine inlet valves 10,11 and first and second 10 normally closed engine exhaust valves 12,13. An inlet bridge extends between the inlet valves 10,11 and is positioned adjacent an associated inlet rocker arm 16. An exhaust bridge 15 extends between the engine exhaust valves 12,13 and is positioned adjacent an associated exhaust rocker arm 17. A cam system 18 is associated with each inlet and exhaust rocker arm 16,17 for controllably moving the rocker arms 16,17 and the associated valves 10–13 to an open position. An electronically controlled fuel injector unit 19 has a plunger 20 and an associated fuel injection rocker arm system 21.

Figure 3:
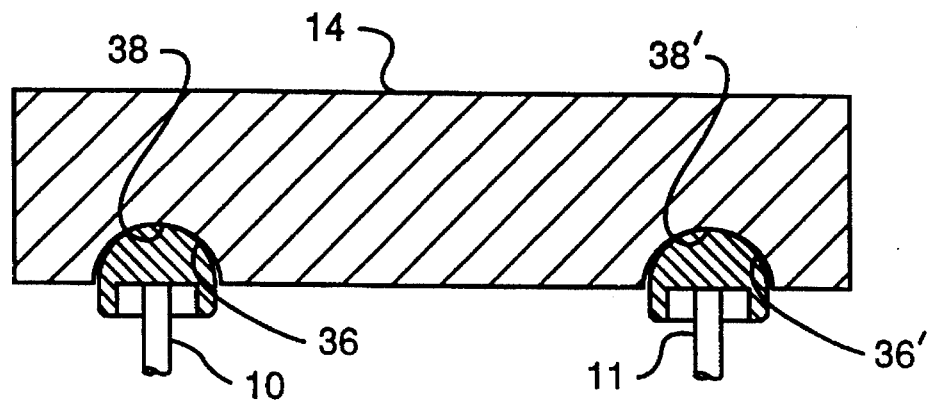
FIG. 3 is a diagrammatic side view of the bridge connecter and valve stems of the engine.

Referring to FIGS. 1 and 3, a bridge connector 30 is provided which has first and second ends 32,34 and is fixedly connected at a respective end 32/34 to the inlet bridge 14 and the exhaust bridge 15. Preferably, the inlet, exhaust and bridge connector 14,15,30 are a unitary element of general "U" configuration.

Referring to FIG. 3, the inlet and exhaust bridges 14,15 are of a construction sufficient for rocking and sliding motion of the bridges 14,15 relative to their associated inlet and exhaust valves 10–13. As can be seen, such rocking capability is provided by the stem crown 36 of the valves 10–13 being seated in a respective arcuate depression 38 formed in the inlet and exhaust bridges 14,15.

Figure 2:
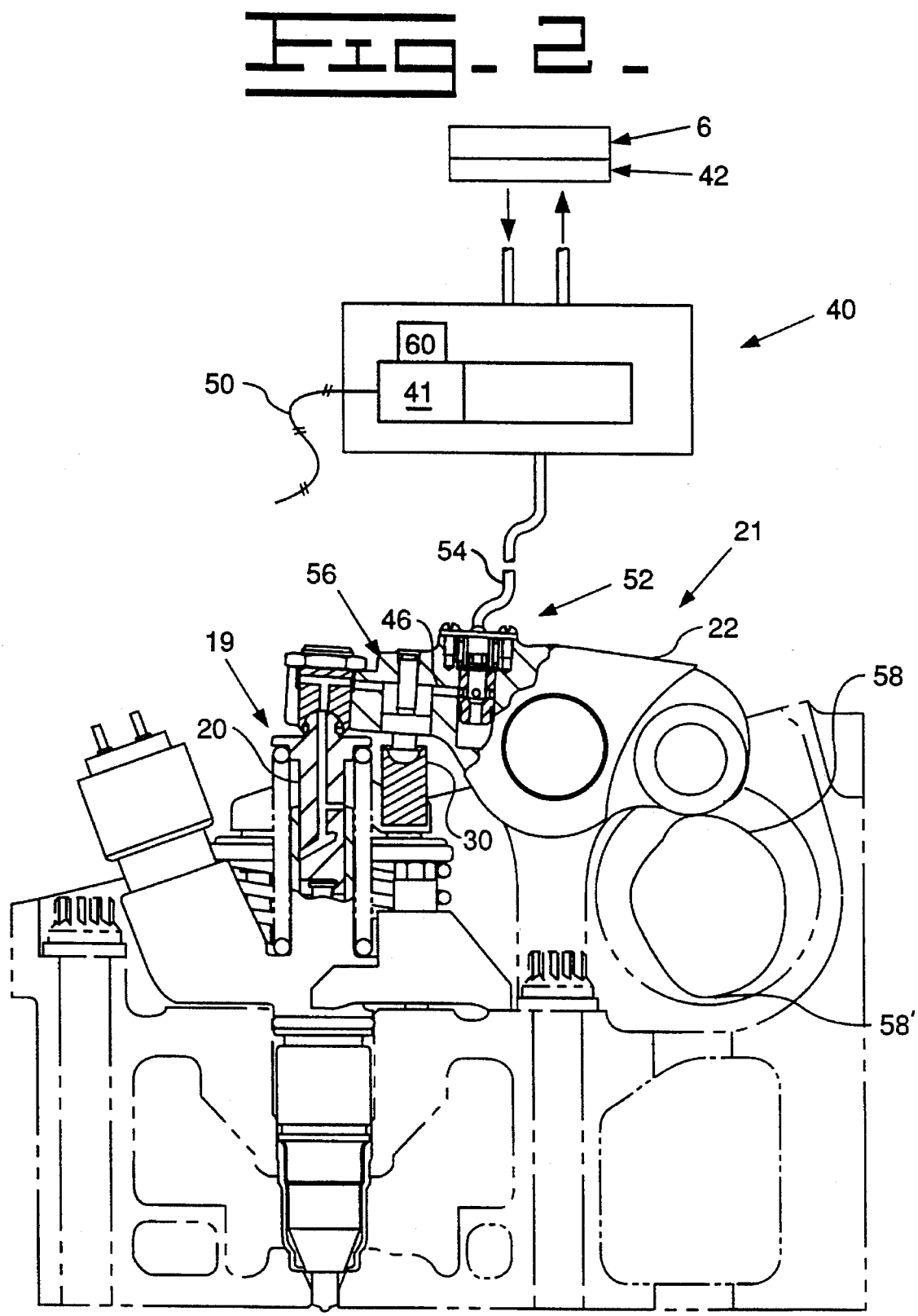
FIG. 2 is a diagrammatic view of the compression braking system of this invention.

Referring to the braking system 2 in FIG. 2, an on/off brake controlling system 40 is connected to the low pressure engine oil supply 42. The unit injector 19 is preferably electronically controlled and connected via electric line 50 to a controller 41 of the on/off brake controlling system 40 in a manner adapted to actuate the unit injector unit 19 via switch 60 in response to the brake controlling system 40 being in the off position and deactivating the injector unit 19 in response to the brake controlling system 40 being in the on position. A piston 56 is positioned between the bridge connector 30 and the associated injector unit rocker arm 22 of the injector unit rocker arm system 21. The piston is connected to the engine oil line 54. A check valve 52 is position in engine oil line 54 in the injector rocker arm between the brake controlling system 40 and the injector rocker arm piston 56.

An oil line extends from the piston to the injector plunger. Bypass holes in the plunger are positioned to control timing of the opening of the inlet/exhaust valve.

Figure 4:
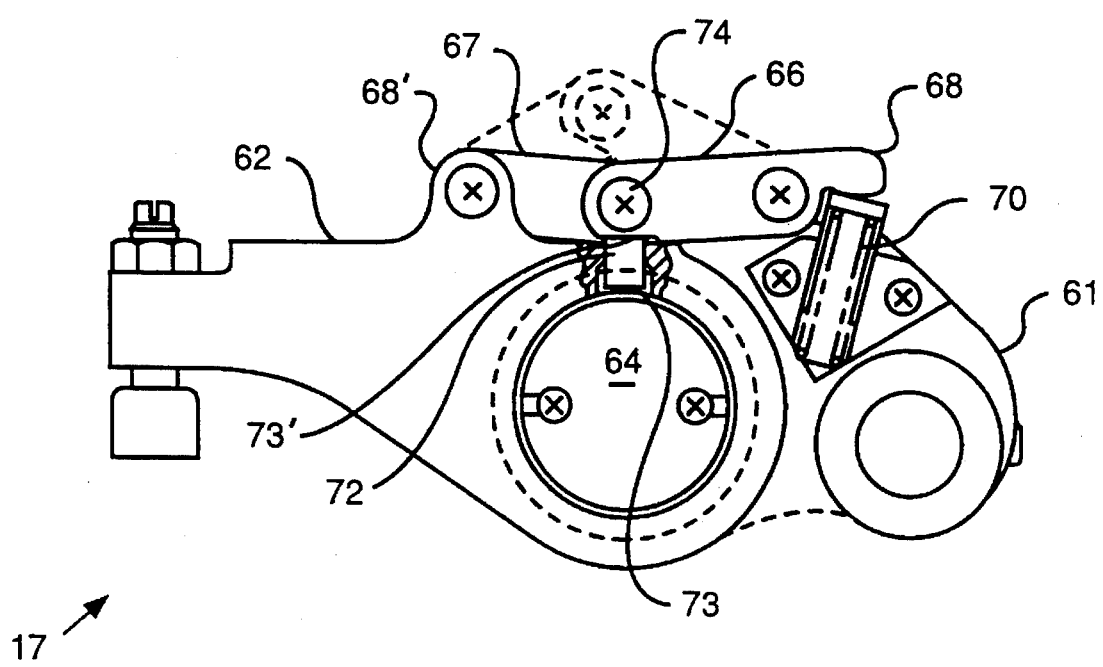
FIG. 4 is a diagrammatic side view of the exhaust rocker arm of this invention.

Referring to FIG. 4, the exhaust rocker arm 17 has first and second rocker arm portions 61,62 pivotally moveable relative to one another about the rocker arm shaft 64. A pair of over-center holding links 66,67 are pivotally connected one to the other and pivotally connected at opposed ends 68,68' to a respective exhaust rocker arm portion 61,62.

A second piston 72 has one end 73/ connected to one of the exhaust rocker arm portions 61/62 and the other end 73/73' positioned adjacent the pivotal connection 74 of the links 66,67 one to the other. The second piston 72 is hydraulically connected in fluid communication to the first piston 56 via line 76 and is actuatable in response to the on/off brake controlling system 40 being actuated. One skilled in the art can, without undue experimentation, determine the force of the spring 70 relative to the line pressure for desired control of the second piston 72.

The second piston 72 is retracted in the off position of the controlling system 40 and extended in the on position. The exhaust rocker arm 17 is therefore normally maintains in the first actuatable position via the spring 70 and pair of links 66,67 and maintained at a deactivated second position via the extended second piston 72, the pair of links, and the line 76 pressure opposing the spring 70 force. The line 76 is pressurized in response to activating the brake controlling system 40.

A biasing means, preferably a compression spring 70, is connected to the first rocker arm portion 61 and positioned adjacent and in forcible contact with the first link 66. The spring 70 functions to maintain the links 66,67 in an actuatable first position during normal operation of the engine 4.

INDUSTRIAL APPLICABILITY

In the operation of the braking system of this invention, in the off position of the controller 41, the valves 10–13 are opened and closed in the normal manner as is well known in the art. In the on position of the controller 41, the injection of fuel to the cylinder 8 is terminated in response to actuating the braking system 2. However, the injector rocker arm 22 continues to be moved by its associated injector cams 58,58'. The piston is hydraulically extended and locked in position and motion of the injector rocker arm is transferred to the bridge connector.

The line 76 pressure in the on position of the brake controlling system 40 causes the second piston to be extended, the links 66,67 moved to a position at which the exhaust valve 12 is not reacted upon by the rotation of the rocker arm shaft and the exhaust valve 12 remains in the closed position. In the off position of the brake controlling system 40 the line 76 pressure bleeds back to tank to magnitude which permits spring 70 to move the links 66,67 to their normal operating condition.

The bridge connecter 30, rocks the inlet and exhaust bridges 14,15 and moves one engine inlet valve 11 and one exhaust valve 13 to their open position. As will be understood by one skilled in the art, the valves 11,13 are thereby opened near top dead center of the compression stroke. Therefore, the engine cylinder 8 is opened to the atmosphere via valves 11,13 releasing the compression energy.

By so providing the injection rocker arm cam with two lobs, the system provides a four cycle engine with two cycle compression braking. Therefore, in the operation of the system, opening of the exhaust valve by the exhaust valve cam is canceled and the cylinders are opened to atmosphere adjacent top dead center on both the exhaust and compression strokes of the cylinder.

By so opening the valves 11,13 the pressure energy within the cylinder is released and therefore is not returned to the cylinder. In this manner the engine is compression braked.

Other aspects, objects and advantages of this invention can be obtained from a study of the drawings, the disclosure and the appended claims.

What is claimed is:

1. A compression braking system for a four cycle engine having a low pressure oil supply, an oil reservoir, and a plurality of cylinders, each of said cylinders having first and second normally closed engine inlet valves, first and second normally closed engine exhaust valves, an inlet bridge extending between the inlet valves and adjacent an associated inlet rocker arm, an exhaust bridge extending between the engine exhaust valves and adjacent an associated exhaust rocker arm, a cam system associated with each inlet and exhaust rocker arm for controllably moving the rocker arm and the associated valves to an open position, and an electronically controlled fuel injector unit and an associated cam actuated fuel injection rocker arm system, comprising:

a bridge connector having first and second ends and being fixedly connected at a respective end to the inlet bridge and the exhaust bridge, said inlet and exhaust bridges being of a construction sufficient for rocking motion of the inlet and exhaust bridges relative to their associated inlet and exhaust valves;

an on/off brake controlling system connectable to the low pressure oil supply;

a piston positioned between the bridge connecter, in the associated unit injector rocker arm, connected to the unit injector outlet and adapted for controllably pressurizing said piston, contacting said bridge connecter and moving said bridge connector and one engine inlet valve and one engine exhaust valve to an open position in response to movement of the unit injector piston by the unit injector rocker arm;

a check valve positioned between the brake controlling system and the piston;

said exhaust rocker arm having first and second rocker arm portions pivotally moveable relative to one another and a pair of over-center holding links pivotally connected one to the other and pivotally connected at opposed ends to a respective exhaust rocker arm portion;

said cam of said fuel injection rocker arm having two actuating lobes positioned about 180 degrees apart;

a spring connected to the first rocker arm portion and being positioned adjacent the first link, in forcible contact therewith, and maintaining the links in an actuatable first position; and a second piston having one end connected to one of the exhaust rocker arm portions and the other second piston end positioned adjacent the pivotal connection of the links one to the other, said second piston being hydraulically connected in fluid communication said brake controller 41, said exhaust rocker arm being normally maintained in the first actuatable position via said spring and pair of links and being maintained in a second deactivated position via said extended second piston, pair of links, and pressurized controlling system.

2. A compression braking system, as set forth in claim 1, wherein the one inlet valve and one exhaust valve are opened in response to movement of the injector rocker arm during the period when fuel would be injected if the injector unit were activated.

3. A compression braking system, as set forth in claim 1, wherein the one inlet valve and one exhaust valve are open when the associated cylinder is at and adjacent top dead center on the firing stroke.

4. A compression braking system, as set forth in claim 1, wherein the inlet, exhaust and bridge connectors are a unitary element of general "U" configuration.

5. A compression braking system, as set forth in claim 1, wherein each cylinder of the engine has a bridge connector and a piston associated with the bridge connector, said pistons each being connected to a respective unit injector reservoir and to the check valve and the on/off brake controller system whereby all cylinders of the engine have compression braking capabilities.

6. A compression braking system, as set forth in claim 5, wherein each cylinder of the engine has compression braking via the exhaust valve.

* * * * *